June 2, 1970  C. TAYLOR  3,515,284
SPRING CLIP ASSEMBLIES
Filed Aug. 13, 1968  3 Sheets-Sheet 1
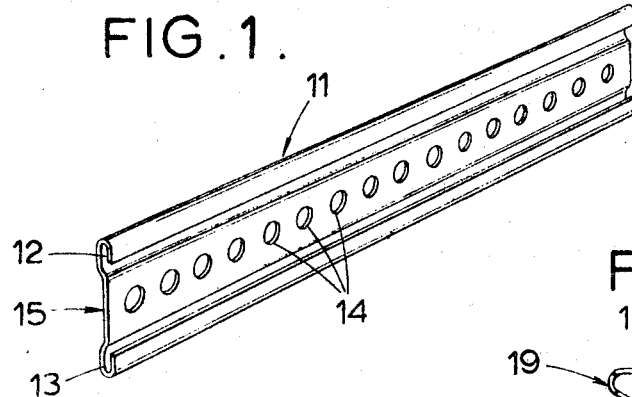
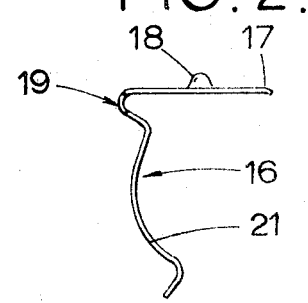
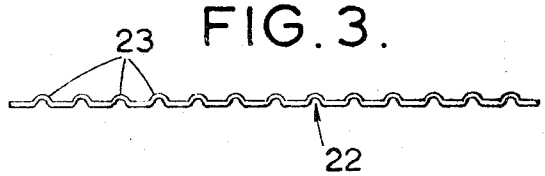
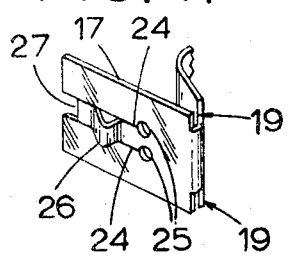
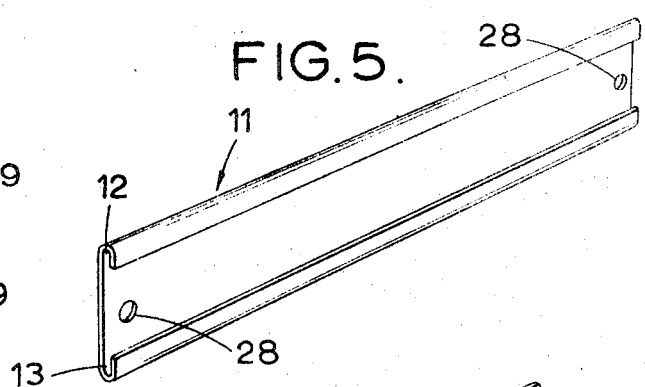
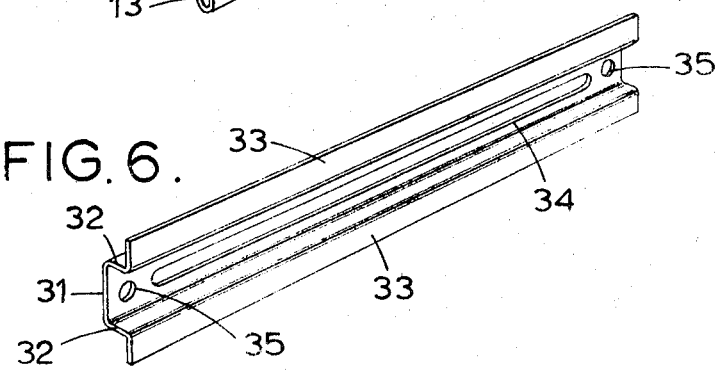
INVENTOR
Cyril Taylor
BY Kenway, Jenney & Hildreth
ATTORNEY June 2, 1970  C. TAYLOR  3,515,284
SPRING CLIP ASSEMBLIES Filed Aug. 13, 1968  3 Sheets-Sheet 2

INVENTOR
BY Cyril Taylor
Kenway, Jenney & Hildreth
ATTORNEY

June 2, 1970  C. TAYLOR  3,515,284
SPRING CLIP ASSEMBLIES

Filed Aug. 13, 1968  3 Sheets-Sheet 3

INVENTOR
Cyril Taylor
BY
Kenway, Jenney & Hildreth
ATTORNEY

United States Patent Office 3,515,284
Patented June 2, 1970

3,515,284
SPRING CLIP ASSEMBLIES
Cyril Taylor, 67 Bittell Road, Barnt Green,
Worcestershire, England
Filed Aug. 13, 1968, Ser. No. 752,255
Claims priority, application Great Britain, Aug. 18, 1967,
38,157/67; Jan. 18, 1968, 2,661/68
Int. Cl. A47f 7/00
U.S. Cl. 211—60       7 Claims

ABSTRACT OF THE DISCLOSURE

In an adjustable support assembly comprising a runner bar and at least a pair of support components adapted to slide along the runner bar the improvement comprising a portion of each support component being formed of a resilient strip of V-form, one limb of the V-form portion engaging a surface of the runner bar to resiliently urge the other limb thereof into frictional engagement with another surface of the runner bar to resist sliding movement along the runner bar, each support component being slidable along the runner bar by substantial frictional disengagement of the said other limb thereof from the said other surface of the runner bar, a pair of support components cooperating with the runner bar to form a complete support assembly, the width of the complete support assembly so formed being adjustable by sliding movement of each support component along the runner bar.

---

The invention relates to adjustable support assemblies, and particularly to assemblies of bowed-jaw spring clips, preferably adapted to be fixed to a wall or other surface and used for holding tools or other implements or the like.

According to one aspect of the present invention there is provided an adjustable support assembly comprising an elongated member, a series of components each forming a part of an adjustable support member and means whereby said support components are adapted to be mounted on the elongated member so that pairs of adjacent support components form complete adjustable support assemblies mounted on the elongated member.

According to another aspect of the present invention there is provided an adjustable support assembly comprising a runner bar, a series of support components each forming part of an adjustable support member adapted to slide along the runner bar and to be secured thereon and means for resisting sliding movement of the clip halves along the runner bar, so that pairs of adjacent support components complete support members mounted on the runner bar.

Embodiments of the invention will now be described by way of example only with reference to the accompanying drawings in which:

FIG. 1 is a perspective view of an elongated member or runner bar forming part of an assembly according to the invention;

FIG. 2 is a plan view of a clip half adapted to be secured to the runner bar of FIG. 1;

FIG. 3 is a plan view of part of a modification;

FIG. 4 is a perspective view of a part of an alternative form of clip half;

FIG. 5 is a perspective view of an alternative form of runner bar particularly suitable for use with clip-halves of FIG. 4;

FIG. 6 is a perspective view of a further alternative runner bar.

Figure 7:
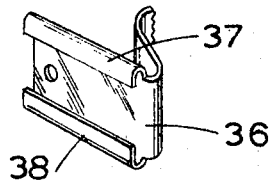
FIG. 7 is a perspective view of part of a clip half for use with the runner bar of FIG. 6.

FIG. 1 shows a generally channel section member 11 which constitutes an elongated member or runner bar of an assembly according to the invention. The runner bar 11 is formed from a metal strip or any suitable material including plastics, the edges of which are inwardly directed to form a lipped channel section or generally C-shaped member. This shaping operation forms two grooves 13 and 13 at the upper and lower edges respectively of the runner bar.

A central base portion of the runner bar 11 is provided with a series of holes 14 at regularly spaced intervals along the length thereof. This base portion may be recessed as shown at 15 or alternatively it may remain flat.

FIG. 2 shows a spring clip half 16 which corresponds in most respects to one half of a conventional bowed-jaw spring clip. However, the base part 17 of the spring clip half 16 is provided with a projection 18 on its rear face. Such a projection may be formed by stamping operation from the front surface of the clip half 16. The clip half 16 also includes upper and lower notches 19 at the junction between the base part 17 and the spring arm 21.

In order to assemble a spring clip assembly according to the invention a series of clip halves 16 are assembled on the runner bar 11 as will be described hereinafter. The base part 17 of the clip half 16 is arranged to be a sliding fit in the grooves 12 and 13 of the runner bar 11. The two notches 19 provide a clearance for the spring leg 21 of the clip half. The projection 18 engages in the holes 14 in the back of the runner bar 11 and the combination of projection 18 and hole 14 forms a means for resisting the sliding movement of the clip half along the runner bar. A second clip half, which may be identical to the first clip half is inserted into the runner bar 11 in such a direction that it faces the first clip half to be inserted. Both clips halves are held in position by means of their projections 18 in appropriate holes 14 so that together they constitute a complete bowed-jaw spring clip.

The width of the spring clip and thus the size of the article to be held in the clip can be adjusted by moving one of the clip halves either toward or away from the other clip half by a distance equal to the spacing of the holes 14.

Additional clip halves either of the same size as the first two clip halves or of a different size may be mounted in the runner bar in the same way as described above in order to provide further spring clips therealong.

The assembly of one or more spring clips in the runner bar 11 may be secured to a wall or other surface by means of screws engaged in vacant holes 14, for example at the ends of the runner bar.

If the projections 18 are smaller than the thickness of the material of the runner bar 11, so that they extend into but do not project through the holes 14, then the recess 15 at the back of the runner bar is not necessary.

In one modified form of the invention the holes 14 are replaced by projections corresponding to the projections 18. Similarly, the projections 18 of the base part 17 of the clip half 16 is replaced by a hole corresponding to a hole 14. The clip halves are then located by means of these projections and holes. In a further alternative, the holes 14, or the corresponding holes in the clip halves 16 are replaced by depressions formed in the surface of the runner bar or clip half.

In a further alternative, the runner bar 11 is formed without any projections, recesses, or holes. Instead, a corrugated strip member 22, as shown in FIG. 3, is inserted into the runner bar and is located therein for example by the screws which are used to mount the runner bar on a wall or the like.

The corrugations 23 are then employed in place of projections or depressions, depending on which side of the strip 22 is outermost. These projections or depressions then co-operate with corresponding devices on the clip halves in order to locate the clip halves within the runner bar.

FIG. 4 shows a further slight modification of the arrangement shown in FIGS. 1 and 2 in which the projection 18 is formed in an alternative manner. The base part 17 of the clip half has two longitudinal slits 24 cut from its free end towards but not as far as the opposite end of the base part 17. The slits terminate in holes 25 pierced or drilled through the base part 17 to prevent excessive stress concentrations at the roots of the slits. A projection 26 similar to the projection 18 of FIG. 2 is then formed in the tongue 27 formed between the two slits by bending this tongue as shown. It may be necessary to form the projection in this way rather than in the manner described with reference to FIG. 2 if there are difficulties in bringing the steel or other material used for the clip halves to a sufficiently ductile condition to enable the projection 18 described with reference to FIG. 2 to be formed.

In a further particularly advantageous modification, clip halves as shown in FIG. 4, or possibly that as shown in FIG. 2, are used in conjunction with an elongated member or runner bar as shown in FIG. 5. This runner bar corresponds generally to that shown in FIG. 1, but there is no series of holes or projections or depressions corresponding to holes 14 and no recess corresponding to the recess 15. There are merely two screw mounting holes 28.

Clip halves such as shown in FIG. 4 are so dimensioned that they are a friction fit in the runner bar of FIG. 5. The friction fit is such that by holding the clip half near the base 17 it is possible to slide it along the runner bar. However, a lateral force applied near the outer part of the spring leg 21 (see FIG. 2) tends to tilt the clip half and results in an increased friction grip which prevents sliding movement along the runner bar.

Thus, the clip halves may be located at any position along the runner bar and there is also the advantage of simplicity due to the absence of a series of holes or depressions or projections in the runner bar.

FIGS. 6 and 7 together show an alternative form of runner bar and tool clip half. In this case, the runner bar is in the form of a channel section member with a base 31, flanges 32 and outwardly directed lips 33. There is a longitudinal slit 34, extending over most of the length of the base 31 of the runner bar. Two screw holes 35 are provided for mounting the runner bar on a wall or the like with the base 31 in engagement with the wall. A series of clip halves of the general form shown in FIG. 2 but having mounting portions as shown in FIG. 7 are mounted on the runner bar of FIG. 6. The mounting portions 36 of each tool clip half comprises a generally flat portion with two bent-over portions 37 and 38 adapted to engage behind the lips 33 of the runner bar. As in the previous embodiments, a series of clip halves can be slid along the runner bar to form a series of complete clips. In order to rotate each clip half with respect to the runner bar a hole 38 is provided in the clip half and a screw, not shown is passed through this hole and the slot 34 and into the surface onto which the runner bar is mounted.

Figure 8:
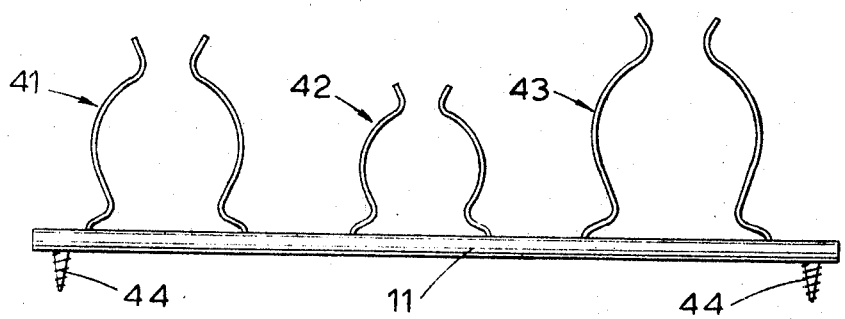
FIG. 8 is a plan view of a typical installation of runner bar and spring clips according to the invention.

FIG. 8 shows a typical assembly of three clips 41, 42 and 43 on a runner bar 11. The runner bar is mounted to a wall or other surface by means of two screws 44, one at each end of the runner bar 11. FIG. 8 shows that a series of clips of differing sizes may be mounted on a single runner bar. However, it is not necessary to employ clips of different sizes in order to accommodate tools or other articles of different sizes. Some range of size variation may be achieved merely by locating the two halves of one clip either close together or far apart. For example, in FIG. 8 the halves of the clip 43 are located comparatively close together, whereas the halves of the clip 41 are spaced comparatively far apart. In spite of the substantial difference in size between the two clips 41 and 43, as shown they are suitable for receiving tools or the like of similar sizes. The larger clip 43 could be adjusted to accommodate larger tools, whereas the clip 41 could be adjusted to accommodate smaller tools.

Figure 9:
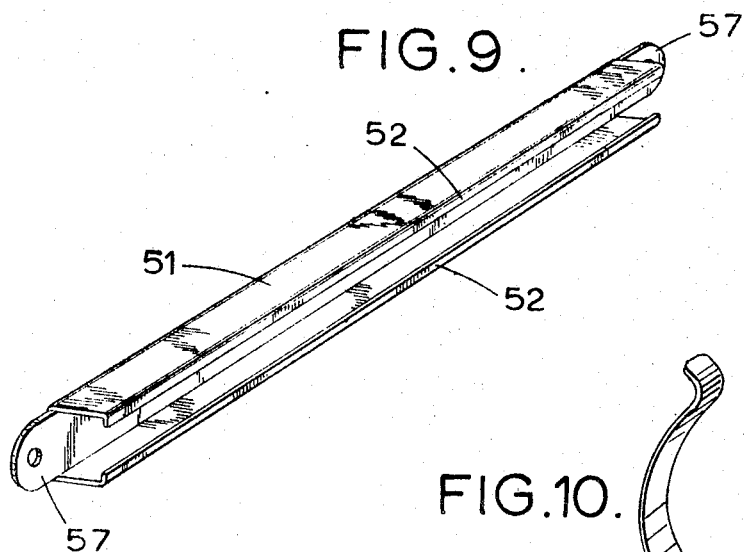
FIG. 9 is a perspective view of a further form of runner bar according to the invention.

FIG. 9 shows a runner bar 51 which is of generally channel section with two lips 52 at the edge of the channel. There are no locating holes or the like along the length of the runner bar because it is intended to grip an appropriate half clip by means of friction.

Figure 10:
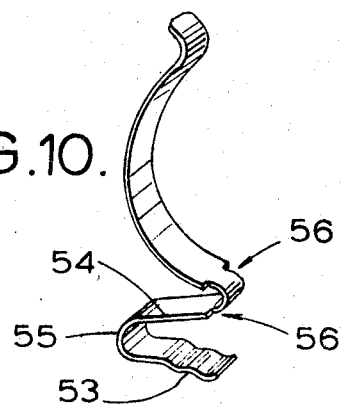
FIG. 10 is a perspective view of a suitable clip half for use with the runner bar of FIG. 9.

A suitable clip half is shown in FIG. 10. It should be noted that this clip half has two legs 53 and 54 joined by a curved portion 55, both legs being for insertion within the channel of the runner bar. Thus, the desired friction grip is achieved by the spring effect between the two legs 53 and 54. In this way, no complicated forming operations such as are required for the clip halves of FIGS. 2, 4, and 7 are required. The leg 53 is corrugated to provide an improved friction grip.

Notches 56 are provided at one end of the leg 54 in order to accommodate the lips 52 of the channel section runner bar.

FIG. 9 shows that the runner bar 51 incorporates a tongue 57 extending out from the end thereof. The purpose of this tongue is to simplify the task of inserting a clip half into the runner bar. In use, the legs 53 of the runner bar is pressed firmly against the tongue 57 to such an extent that the leg 54 can be inserted within the channel section runner bar. Thereafter, the clip half is slid along inside the runner bar.

Figure 11:
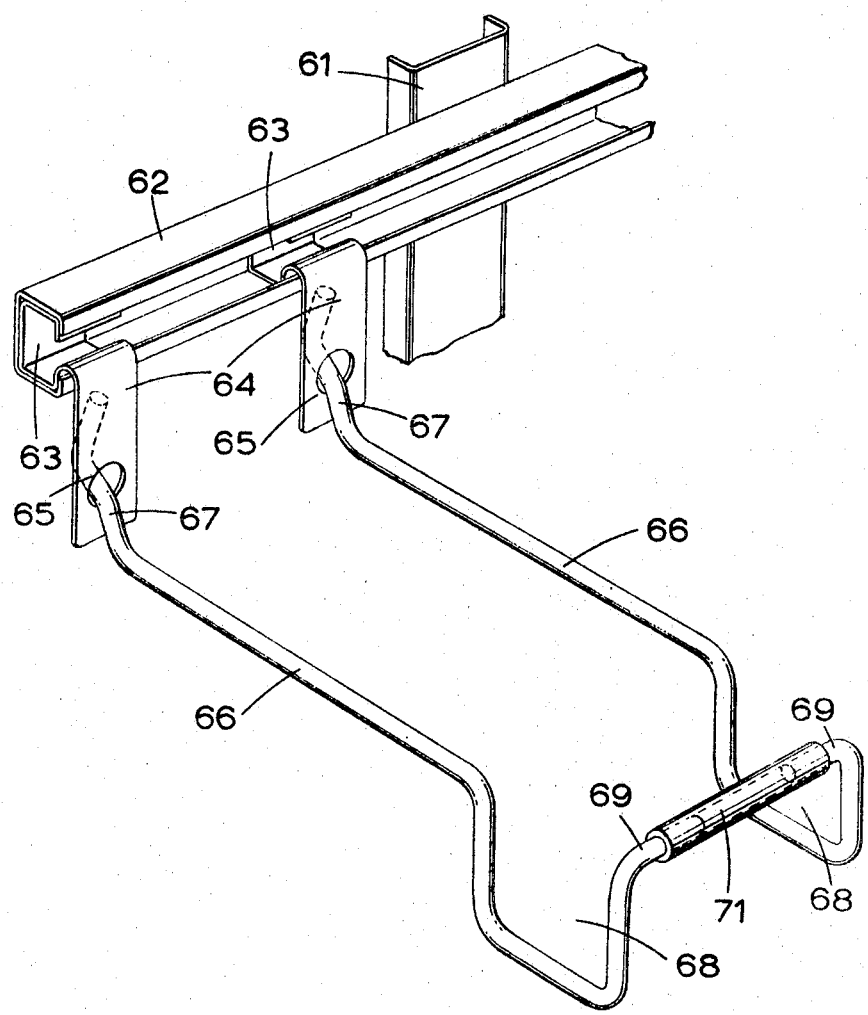
FIG. 11 shows the runner bar of FIG. 9 as part of a display rack and also shows a support member for a book.

As shown in FIG. 11 a runner bar such as that shown in FIG. 9 may be used as part of a display rack. The display rack is constituted by a series of uprights 61, only (one of which is shown) the runner bars being of the type disclosed in FIG. 9.

A pair of clip members 63 are formed from spring steel strip with generally rectangular portions for insertion into the runner bar 62. There is a slight interference fit between the members 63 and the runner bar 62 to prevent free sliding of the members 63 along the runner bar 62. These members 63 also incorporate downwardly depending portions 64 which are apertured at 65. The portions 64 with their apertures 65 may be employed to support any conventional "Peg Board" fittings which are normally used in the display art. A conventional Peg Board is a flat sheet of material incorporating a series of apertures into which any suitable support member may be secured to support a member required as part of a display. A typical Peg Board display would be for a series of books. By way of example, FIG. 11 also shows a typical book support of the type normally used in conjunction with a Peg Board. However, it is to be understood that other typical Peg Board fittings may be used in place of the book support.

The book support shown in FIG. 11 is formed from two wire members 66 each of which has one end 67 shaped to form a trough 68 for the reception of a book. Inwardly directed extensions 69 from the outer ends of the troughs 68 are inter-connected by means of a tube 71 and extensions 69 provides lateral adjustability of the book support. This has the advantage that a large range of book sizes can be supported by standardised wire members 66; a small number of different length of tubes 71 may be required to cater for a wide range of adjustment but a small range of adjustment is available for any given tube 71.

The clip members 63 are of course freely adjustable along the length of the runner bar 62 in order to permit adjustability at the inner end of the book support.

A further practical advantage of this arrangement is that the shape of the individual wire members makes these much more compact for packaging purposes than a typical unadjustable one piece book support and also very substantially simplifies the metal plating operations if the parts are to be chromium plated.

Although only one form of runner bar has been described in conjunction with a support member other than a bowed-jaw spring clip it is to be understood that other embodiments of the runner bar may also be used in conjunction with suitable support members. Also the invention is not restricted to book supports and bowed-jaw spring clips but may also be applied to other adjustable support members.

Although the invention has thus far been described with reference to clip halves and other components which are slidable along a runner bar, the invention is not so limited. For example, the arrangement may be such that the various clip halves or other components may be mounted at any one of a series of locations on a runner bar or elongated member, but without the provision for sliding therealong. In such a case, adjustment of the width of a spring clip or other support member involves removal of one clip half or other component from the elongated member and remounting it either nearer to or further from the other clip half or other component. In this way, the width of a spring clip or other support member can be adjusted to correspond to the desired width appropriate to the articles to be supported.

I claim:

1. In an adjustable support assembly comprising a runner bar and at least a pair of support components adapted to slide along the runner bar the improvement comprising a portion of each support component being formed of a resilient strip of V-form, one limb of the V-form portion engaging a surface of the runner bar to resiliently urge the other limb thereof into frictional engagement with another surface of the runner bar to resist sliding movement along the runner bar, each support component being slidable along the runner bar by substantial frictional disengagement of the said other limb thereof from the said other surface of the runner bar, a pair of support components co-operating with the runner bar to form a complete support assembly, the width of the complete support assembly so formed being adjustable by sliding movement of each support component along the runner bar.

2. An adjustable support assembly according to claim 1 wherein the runner bar is of channel section and each support component is of tapered width adjacent the V-form portion defining a shoulder, the shoulder abutting against the free longitudinal edges of the runner bar to secure the support component therein.

3. An adjustable support assembly according to claim 1 wherein the support components are components of a bowed-jaw spring clip and wherein a pair of such components co-operate with the runner bar to form a complete bowed-jaw spring clip.

4. An adjustable support assembly according to claim 1 wherein the support assembly comprises a book support.

5. An adjustable support assembly according to claim 1 wherein the support assembly comprises an adjustable support assembly of the Peg Board fitting type.

6. A support component adapted for use with a support assembly according to claim 1.

7. A runner bar adapted for use with a support assembly according to claim 1.

References Cited

UNITED STATES PATENTS

| | | | |
|---|---|---|---|
| 1,223,998 | 4/1917 | Maynard | 248—307 |
| 1,739,057 | 12/1929 | Bock | 248—307 X |
| 1,786,038 | 12/1930 | Swanson | 248—307 X |
| 2,695,105 | 11/1954 | Mitchell | 211—94 X |
| 2,787,435 | 4/1957 | Shields | 248—225 |
| 2,931,612 | 4/1960 | Graber | 248—307 X |
| 3,094,305 | 6/1963 | Lohrman | 248—225 |
| 3,288,414 | 11/1966 | Fortunato | 248—307 |

JAMES A. LEPPINK, Primary Examiner

U.S. Cl. X.R.

211—94; 248—307